United States Patent [19]

Shanoski et al.

[11] 4,239,796

[45] Dec. 16, 1980

[54] IN-MOLD COATING OF STRUCTURAL FOAMS AND RESULTANT PRODUCT

[75] Inventors: Henry Shanoski; Richard M. Griffith, both of Akron, Ohio

[73] Assignee: The General Tire & Rubber Company, Akron, Ohio

[21] Appl. No.: 50,902

[22] Filed: Jun. 21, 1979

[51] Int. Cl.³ .................... B32B 5/18; B29D 27/00
[52] U.S. Cl. .................... 428/315; 264/45.5; 264/46.4; 264/51; 264/129; 264/250; 264/255; 264/296; 264/DIG. 5; 264/DIG. 83; 428/71; 428/325
[58] Field of Search ............ 264/46.6, DIG. 83, 46.4, 264/45.5, 129, 250, 255, 296, DIG. 6, 51; 428/71, 315, 325

[56] References Cited

U.S. PATENT DOCUMENTS

| | | | |
|---|---|---|---|
| 3,538,043 | 11/1970 | Herold | 260/40 R |
| 3,576,909 | 4/1971 | Schmidle et al. | 528/289 X |
| 3,813,462 | 5/1974 | Roberts | 264/46.6 |
| 3,875,275 | 4/1975 | Lemelson | 264/46.6 X |
| 3,903,224 | 9/1975 | Billiu | 264/46.7 |
| 4,032,683 | 6/1977 | Coale | 264/129 X |
| 4,053,545 | 10/1977 | Fay | 264/DIG. 83 |
| 4,076,788 | 2/1978 | Ditto | 264/279 X |
| 4,081,578 | 3/1978 | Van Essen et al. | 264/296 X |
| 4,082,486 | 4/1978 | Cerano et al. | 425/550 X |

*Primary Examiner*—Philip Anderson

[57] ABSTRACT

A method is disclosed comprising in-mold coating a structural foam part made from a thermoplastic aromatic polycarbonate resin or a thermoplastic ABS polymer resin with a thermosetting in-mold coating composition at a pressure of from about 25 to 50 p.s.i. and at a temperature not in excess of about 200° F. for from about 1 to 10 minutes, preferably for from about 1 to 3 minutes, to provide hard, smooth and adherent coatings, said thermosetting in-mold coating composition comprising an ethylenically unsaturated polyester resin and an ethylenically unsaturated monomer(s) catalyzed with an organic peroxide initiator including an accelerator for the initiator.

10 Claims, No Drawings

IN-MOLD COATING OF STRUCTURAL FOAMS AND RESULTANT PRODUCT

This invention relates to the in-mold coating of thermoplastic aromatic polycarbonate resin and thermoplastic ABS polymer resin structural (rigid) foams with an in-mold thermosetting coating composition comprising an unsaturated polyester resin and a crosslinking monomer(s) for the unsaturated polyester resin.

BACKGROUND

Foamed, rigid or structural thermoplastic moldings offer basically the same wide range of attractive properties as do unfoamed rigid thermoplastic moldings plus lower density, high strength to weight ratios and freedom from sinks, warping and molded-in stresses while overall shrinkage remains about the same as for solid moldings. A sink and stress-free part is a major advantage of a structural thermoplastic foam molding over a structural thermoplastic solid molding.

The foamed structural thermoplastic moldings may be made by high pressure or low pressure processes.

High pressure processes (cavity pressures of about 1,000 to 5,000 p.s.i.) can make structural foam parts with fair to excellent surfaces and with thinner walls than with a low pressure molding process. Also, high pressure molding is said to give 25 to 50% shorter cycles, better reproduction of mold detail and to be readily converted to conventional injection molding. However, cavity pressure is about the same as that for conventionally injection molded solid thermoplastics so that the maximum part size is ordinarily limited to about 25 pounds which is approximately the same as that obtained with solid parts. Also, the high pressure process requires that the mold be completely packed with resin and then the mold be expanded to allow the molten resin to foam. Unless the part to be made is essentially flat, this requires the mold to be expanded in several directions which may be impractical. An alternative to this is to withdraw part of the melt, but this is little practiced. Furthermore, a blemished area is left on the part where a new mold area is exposed as the mold expands. These problems restrict the use of high pressure processes since the advantages of foaming rarely outweigh the drawbacks where solid part high pressure molding is an alternative.

Many manufacturers use the low pressure processes to form structural thermoplastic foam moldings or parts, because this method permits making giant parts (up to 100+ pounds) and so enables the consolidation of many small parts into one unit. In this process, the mold is undershot (incompletely filled) and the charge fills the mold by free expansion of gas filled charge or melt on heating. Cavity pressures in the low pressure process may be very high initially at the point of injection but finally average about 300 p.s.i. Thus, the press and mold costs are less for the low pressure process which additionally can make large parts and profitable short runs. Nevertheless, only about 10 to 20 inches of flow from injection points is normally possible when using the low pressure process, and, even for this, very fast injection is required. Therefore, large part molding is best performed with specialized injection molding machines distinguished by a large hot manifold with multiple injection nozzles. The multiple injection points required and the tendency towards large inclusions of air demand superior molding skills.

The most serious limitations of thermoplastic structural foam parts made by the low pressure process are the rough (1000µ inch variations), wrinkled, mottled surfaces and inability to effectively foam sections less than 0.2 inch. A wood-like surface is especially easy to obtain, but high gloss (like lacquered metal) surfaces are prohibitively expensive. The surface can be improved or masked by sanding, filling, priming and painting, but this is labor intensive and may represent ⅓ to ½ of the total part cost if high gloss is desired (for office machine covers, automobile body parts and so forth).

Helpful but limited approaches to achieving smoother surfaces of varying degrees which may not be suitable for all part shapes include (1) delayed cooling by covering the mold cavity with a heat insulating film, (2) painting the mold cavity and allowing the paint film to transfer to the molding, (3) injecting into a plastic shell preinserted into the mold, (4) injecting gas-free melt ahead of the foamable melt so as to encapsulate the foam formed with a solid skin, (5) pressurizing the mold enough to reduce evolution of gas at the front of the injected melt and (6) injecting into a hot mold and then cooling the mold.

It, therefore, is an objective of the present invention to attempt to overcome the difficulties alluded to hereinabove and to provide a method for in-mold coating a thermoplastic structural foam molded part of a polycarbonate resin or an ABS polymer resin so that the part exhibits an improved surface.

These and other objects and advantages of the present invention will become more apparent to those skilled in the art from the following detailed description and working examples.

SUMMARY OF THE INVENTION

According to the present invention it has been found that thermoplastic structural foam moldings or parts made from polycarbonate resins or ABS polymer resins can be in-mold coated at low curing temperatures and low pressures to provide an adherent, glossy, hard and smooth thermoset coating or layer on the structural foam part using an in-mold coating thermosetting composition comprising an unsaturated polyester resin and an unsaturated crosslinking monomer(s) including a peroxide initiator and an accelerator for the initiator for the crosslinking or copolymerization of the unsaturated polyester and unsaturated monomer(s). The in-mold coating covers up the surface defects of the substrate.

The in-mold coating composition is hard, adherent to the substrate and has an elongation generally commensurate with the substrate which of course is a rigid material. By use of appropriate amounts of polyester and monomer(s) desirably including filler it is possible to obtain in-mold coatings which have good to excellent adhesion to the substrate, a pencil hardness of at least 1 H (ASTM) and an elongation of at least 1%.

While the process of the present invention is especially useful in improving the surface appearance of low pressure molded structural foam, it is applicable also to coating the surface of high pressure molded structural foam.

It is apparent that the present process provides a quick and easy way to improve the surface of structural foams and to overcome many of the problems heretofore experienced.

DISCUSSION OF DETAILS AND PREFERRED EMBODIMENTS

The in-mold coating composition can be applied to the structural foam part in the injection mold after the part has been cooled in the mold to not over about 200° F. or lower to prevent blowing when the mold is opened or distortion of the part. The coating is applied to the surface of the cooled part, and the mold is then closed and pressure and heat applied if necessary not above about 200° F. to cure the in-mold coating. The in-mold coating composition can be applied manually to the surface of the cooled part or injected onto the surface of the cooled part after the mold has been cooled and opened a small distance (a few mils) to receive the coating charge. The mold is then closed and the coating is cured. Alternatively, the part can be removed from the mold after cooling as described above and placed in another mold and in-mold coated therein. Since the in-mold coating composition is very reactive and is catalyzed to cure fairly quickly at relatively low temperatures, its pot life at room temperature is necessarily short. Accordingly, the composition should be used promptly after mixing when hand pouring and so forth. For injection or compression molding a two-component injection system should be employed where the initiator (catalyst), or the accelerator, is added to the polyester resin-monomer mixture immediately prior to application to the structural foam part. The in-mold coating composition is then heated to cure it (cause it to thermoset) at temperatures not in excess of about 200° F. for from about 1 to 10 minutes, preferably from about 1 to 3 minutes, at pressures of from about 25 to 50 p.s.i.

Thermoplastic aromatic polycarbonates used in the practice of the present invention are well known to those skilled in the art. They can be prepared by the phosgenation of aromatic dihydroxy compounds in the presence of pyridine, by the interfacial polycondensation of aqueous solutions of the alkali salts of aromatic dihydroxy compounds with a phosgene solution, and by the transesterification of aromatic dihydroxy compounds with diaryl carbonates. The starting aromatic compound used is usually bisphenol-A, but other compounds can be employed such as bis (4-hydroxyl phenyl) methane, 2,2-bis (4-hydroxy-3-methyl phenyl) propane, 4,4-bis (4-hydroxyl phenyl) heptane, 2,2-(3,5,3',5'-tetrachloro-4,4'-dihydroxydiphenyl) propane, 2,2-(3,5,3',5'-tetrabromo-4,4'-dihydroxydiphenyl) propane, (3,3' dichloro-4,4'dihydroxydiphenyl) methane and the like and mixtures thereof. Copolymers of these bisphenol Type A compounds can be used as well as mixtures of these aromatic polycarbonates. They can be halogenated on the aromatic ring if desired to obtain self extinguishing properties or on the connecting

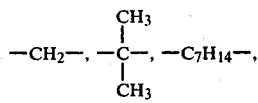

etc. linkage. While any halogen atom can be used, it is preferred to use chlorine and/or bromine. The halogen is used in an amount up to about 5%, preferably up to about 3%, by weight of the aromatic polycarbonate. Instead of being linked or bound to the aromatic polycarbonate, the halogen compound can be intimately mixed with the aromatic polycarbonate in the amount to provide the same amount by weight of halogen content. Examples of some halogenated flame retardants to add to the polycarbonate which can be used are decabromodiphenyl oxide, octobromodiphenyl, chlorinated paraffins, brominated paraffins, tetrabromobisphenol A, tetrachlorobisphenol A and so forth. Ultra violet absorbers and other compounding ingredients, also, can be added to the polycarbonates. These thermoformable, thermoplastic aromatic polycarbonates have average molecular weights of from about 12,000 to 55,000, preferably from about 30,000 to 40,000. Methods for making polycarbonates including the aromatic polycarbonates, their processing and used are disclosed in "Polycarbonates," Christopher and Fox, Reinhold Publishing Corp., New York, 1962; "Chemistry And Physics Of Polycarbonates," Schnell, Interscience Publishers a division of John Wiley & Sons, Inc., New York, 1964, "Encyclopedia of Polymer Science And Technology," Vol. 10, 1969, Interscience Publishers a division of John Wiley & Sons, Inc., New York, pages 710 to 764; "Modern Plastics Encyclopedia," 1970–1971, Vol. 47, No. 10A, October, 1970, McGraw-Hill, Inc., New York, pages 189, 192, 194 and 780; "Modern Plastics Encyclpedia," 1975–1976, October, 1975, Vol. 52, No. 10A, McGraw-Hill Inc., New York, pages 54, 56 and 480; and U.S. Pat. Nos. 3,933,730 and 3,971,756.

Acrylonitrile-butadiene-styrene thermoplastic copolymer resins (ABS polymers), also, are well known. They can be impact resistant and can be used to make structural foam. Many methods are known, which differ as to distribution of monomer units, for making these polymers using in a general a "grafting" technique. For example, two methods are to employ suspension polymerization of solutions of butadiene-acrylonitrile rubbers in styrene monomer and emulsion polymerization of polybutadiene latex swollen with a mixture of acrylonitrile and styrene using an organic peroxide initiated system or a redox system. Thermal and residual catalyst initiation may, also, be used. ABS polymers, further, may be prepared by mixing dry ingredients (polymers and/or copolymers) in a Banbury or on a rubber mill or by mixing latices, for example, of a butadiene-based rubber and an acrylonitrile-styrene copolymer resin. Still other polymerization or grafting processes and blending processes can be employed. These ABS polymers may contain the usual fire retardants, U-V absorbers and other compounding ingredients. For more information on ABS polymers please see "Modern Plastics Encyclopedia," 1969–1970, Vol. 46, No. 10A, October, 1969, McGraw-Hill Inc., New York, page 76, 83, 84 and 968; "Modern Plastics Encyclopedia," 1970–1971, Vol. 47, No. 10A, October, 1970, McGraw-Hill Inc., New York, page 81, 84 and 768; "Modern Plastics Encyclopedia," 1975–1976, October, 1975, Vol. 52, No. 10A, McGraw-Hill Inc., New York, pages 6, 466 and 467; "Encyclopedia of Polymer Science And Technology," Vol. 1, 1964, Interscience Publishers a division of John Wiley & Sons, Inc., New York, pages 436 to 444 and "ABS Plastics," Basdekis, Reinhold Publishing Corp., New York, 1964.

The polycarbonate resin and the ABS polymer resin may be blown or foamed in a compression or injection mold by means of gases or by chemical blowing agents suitable for the resin being employed. Examples of blowing or foaming agents include nitrogen, helium, pentane, hexane, heptane, toluene, methylene chloride, dichloroethane (sym.), trichlorofluoromethane, trichlorotrifluoroethane, 1,1-azobisformamide, azobisisobutyronitrile, benzene sulfonyl hydrazide, p-toluene sulfonyl hydrazide, p,p-oxybis (benzene sulfonyl hydrazide), p-toluene sulfonyl semi-carbazide, N,N'-dimethyl-N,N'-dinitrosoterephthalimide, N,N'-dinitrosopentamethylenetetramine, 5-phenyl tetrazole and trihydrazine triazine and so forth. Some blowing agents should be used with care since they may be hazardous. Also, some blowing agents used for making the structural foam may produce residues which interfere with the coating to cause the interface between the coating and the part to become gummy and/or tacky resulting in loss of adhesion, and, thus, they should be chosen with care. Moreover, it is known that certain blowing agents may deteriorate or degrade the polycarbonate resin.

Before blowing or foaming the ABS polymer resin and polycarbonate resin they should be dried. Drying for a definite period of time is especially desirable for polycarbonates since the presence of moisture may cause a decrease in molecular weight and may cause poor surface appearance.

To make the structural foam part pellets, granules and so forth of the polycarbonate resin or ABS polymer resin are mixed with the blowing agent and any other additive such as filler, color pigment and so forth and fed to a compression or injection molding machine where the resins are foamed to make a molded structural foam article. After cooling, the structural foam part can be compression or injection in-mold coated with the in-mold coating composition disclosed herein or removed to another mold and in-mold coated with the in-mold coating composition disclosed herein.

The ethylenically unsaturated polyester used in the in-mold coating composition should have an average molecular weight of from about 1,000 to 4,500. The polyester may be made by copolymerizing maleic anhydride and an alkylene oxide of 3 to 4 carbon atoms such as propylene oxide, butylene oxide, isobutylene oxide and so forth and mixture thereof. Propylene oxide is preferred. The alkylene oxide may be used in a molar ratio greater than the maleic anhydride to provide a polyester which is essentially or all OH terminated, e.g., a polyester diol. Up to about 50 mol % of the maleic anhydride may be replaced with a saturated anhydride such as phthalic anhydride or other anhydride and mixture thereof. It is preferred to use a mixture of maleic anhydride and phthalic anhydride. Also, up to 10 mol% of the alkylene oxide moiety may be ethylene oxide; greater amounts are undesirable since it may lead to water sensitivity in the final product. These unsaturated polyesters may be made in benzene, styrene or other solvent using a double metal cyanide catalyst as shown in U.S. Pat. No. 3,538,043. As shown in said patent an isomerization catalyst such as piperidine is used to isomerize the maleate double bonds of the polyester to fumarate double bonds. Morpholine, also, may be used as an isomerization catalyst as shown by U.S. Pat. No. 3,576,909. Polyesters made by reacting maleic anhydride or maleic acid, fumaric acid, itaconic acid, or citraconic acid with a glycol like propylene glycol, dipropylene glycol, 1,4-butane diol, bisphenol A and so forth including minor amounts of phthalic acid or phthalic anhydride and other diols and dicarboxylic acids may be used. Preferred polyesters are the substantially aliphatic polyesters like the fumarate polyesters. Also, preferred are the polyesters made using the double metal cyanide catalysts as described above. Mixtures of ethylenically unsaturated polyesters can be used. For more information on making unsaturated polyesters see "Encyclopedia of Polymer Science And Technology," Interscience Publishers a division of John Wiley & Sons, Inc., New York, Vol. 11, 1969, pages 129 to 168.

Vivyl ester resins, also, may be used. These esters are generally linear, and while they may have one or more ethylenically unsaturated groups along or in the chain, they have an ethylenically unsaturated group at or near each end of the polymer chain. They are prepared by reacting an ethylenically unsaturated acid with a bisphenol A epoxy resin, e.g., the epoxide obtained from bisphenol A and epichlorohydrin. In place of bisphenol A one can use tetrabromobisphenol A. Another vinyl ester resin is the one obtained by reacting a phenolic-novolac with an epoxide like epichlorohydrin to obtain a phenolic novolac epoxide which is then likewise chain terminated with an ethylenically unsaturated acid. Another material to use as a starter for reaction with the acid to make a vinyl ester is a tetraphenylolethane epoxy resin. Other epoxides (backbones) for reaction with the unsaturated acids to make vinyl esters may be used. Bisphenol A/fumarate vinyl esters can be used and which can be made using proper stoichiometry by reacting bisphenol A with maleic acid (fumaric acid or maleic anhydride) to form a hydroxy terminated resin which is then reacted with tolylene diisocyanate (or other diisocyanate like 4,4'-diphenyl methane diisocyanate) to form a NCO terminated material which is chain terminated with a hydroxy alkylacrylate such as hydroxy ethyl acrylate or methacrylate or the NCO terminated material can be end capped with glycols for reaction with the monocarboxylic unsaturated acid to form vinyl unsaturation. One may further start with polyalkylene ether glycols, polyester glycols, hydroxy terminated polyalkylene ether urethanes and hydroxy terminated polyester urethanes which can be chain terminated by reaction with the ethylenically unsaturated acid. As the ethylenically unsaturated acid for making vinyl esters by termination one may use acrylic acid, methacrylic acid, crotonic acid or cinnamic acid or mixture thereof of which methacrylic acid is preferred. Internal unsaturated groups as discussed above may be provided by maleic acid, fumaric acid, maleic anhydride, itaconic acid or citraconic acid and the like and mixture of the same. For information on vinyl ester resins see "Heat Resistant Vinyl Ester Resins," Launikitis, Technical Bulletin SC:116-76, Shell Chemical Company, June, 1976. Instead of using an ethylenically unsaturated acid to terminate the above hydroxy terminated backbone polymers one may make use of ester interchange, e.g., reacting the hydroxyl containing backbone polymer with an ester like ethyl, methyl or butyl acrylate, methacrylate or ethacrylate and so forth. Still other vinyl ester resins may be used. Isomerization may be necessary to isomerize maleate groups to fumarate groups if the heat of formation of the vinyl ester is not sufficiently high to cause isomerization.

The ethylenically unsaturated monomer used to crosslink the unsaturated polyester of the in-mold coating composition to provide a thermoset coating has from 1 to 4 carbon-to-carbon double bonds. Examples of such monomers are styrene, vinyl toluene, chlorostyrene, methyl methacrylate, methyl acrylate, divinyl benzene, diallyl phthalate, triallyl cyanurate, trimethylol propane trimethacrylate, trimethylol propane triacrylate, tetraethyleneglycol dimethacrylate, 1,3-butylene glycol diacrylate, pentaerythritol tetra acrylate, and mixtures of the same. Also, it is preferred to use mixtures of these ethylenically unsaturated monomer(s) such as a mixture of styrene or methyl methacrylate and trimethylol propane trimethacrylate, or all three, to get in general the best combination of properties. The monomer(s) should be chosen so as to obtain the desired hardness, elongation and adhesion without excessive attack or solution of the substrate to result in a weak interface or delamination. In other words, by varying the monomer(s) the crosslink density and solubility can be controlled. The ethylenically unsaturated monomer is used in an amount sufficient to copolymerize with and/or crosslink the unsaturated polyester on being catalyzed by means of a free-radical initiator (peroxide) to form a crosslinked, hard and adherent thermoset polyester resin coating. In general, there may be used from about 20 to 80 parts by weight of the unsaturated polyester to from 80 to 20 parts by weight of the unsaturated monomer(s).

An organic free-radical or free-radical generating initiator (catalyst) such as a peroxide is used to catalyze the copolymerization or crosslinking between the ethylenically unsaturated low molecular weight monomer and the ethylenically unsaturated polyester of the in-mold coating composition. The initiator should "kick-off" or decompose and liberate free-radicals when in the presence of an accelerator at temperatures of not in excess of about 200° F. Examples of free-radical initiators include benzoyl peroxide, p-chlorobenzoyl peroxide, lauroyl peroxide, acetyl peroxide, methyl ethyl ketone peroxide, bis (1-hydroxycyclohexyl) peroxide and hydroxy heptyl peroxide (aldehyde peroxide) and the like and mixtures thereof. It is desirable sometimes to use mixtures of initiators to take advantage of their different decomposition rates and times at different temperatures and so forth. A preferred initiator to use is benzoyl peroxide. The peroxide initiator is used in an amount of from about 1.5 to 6% by weight based on the weight of the unsaturated polyester and unsaturated monomer(s) employed in the in-mold coating composition.

The accelerator (promoter) for use with the peroxide initiator (catalyst) for the unsaturated polyester-unsaturated monomer copolymerization can be a tertiary aromatic amine or a cobalt salt like dimethyl aniline, diethyl aniline, N,N-dimethyl-p-toluidine, cobalt naphthenate, cobalt octoate, or other cobalt salt of a carboxylic acid, stannous octoate, ferric acetyl acetonate and so forth. The tertiary aromatic amines like dimethyl aniline are preferred. Some accelerators are effective, or more effective than others, with certain peroxides, and some may cause yellowing. The accelerator should not be mixed alone with the initiator since a violent reaction may occur. Rather the accelerator should be mixed first with the polyester followed by mixing in the initiator. The accelerator is used in a maximum amount of about 1.0% by weight based on the weight of the unsaturated polyester and unsaturated monomer used in the in-mold coating composition.

For more information on peroxide initiators and accelerators for the same please see "Encyclopedia of Polymer Science and Technology," Interscience Publishers a division of John Wiley & Sons, Inc., New York, Vol. 9, 1968, pages 814 to 841 and Vol. 11, 1969, pages 132 and 133; "Glass Reinforced Plastics," Morgan, Interscience Publishers a division of John Wiley & Sons, Inc., New York, 3rd Edition, 1961; "Glass Reinforced Plastics," Parkyn, The Chemical Rubber Company, Cleveland, 1970; "Glass Fibre Reinforced Plastics," de Dani, Interscience Publishers, a division of John Wiley & Sons, Inc. New York, 1960 and "Peroxide Curing of Unsaturated Polyesters," 1. Effect of Some Accelerators and Initiators, Noller, Stengel and Mageli, Report presented at the 16th Annual Meeting of the Reinforced Plastics Division of the S.P.I.

The in-mold coating composition additionally can be filled or compounded to give the desired viscosity and flow to the composition for molding and to afford the desired physical properties to the resulting thermoset coating. Examples of such fillers or compounding ingredients are fillers like clay, talc, MgO, Mg(OH)$_2$, CaCO$_3$ and silica, mold release agents, red iron oxide, TiO$_2$, carbon black, organic color pigments like phthalocyanine blue or green, antidegradants, U-V absorbers, flame retardants, calcium silicate, paraffin wax, hollow glass or resin micro-spheres, thickening agents, inhibitors (hydroquinone, benzoquinone, t-butyl catechol etc.) and the like. These fillers and compounding ingredients should be used in amounts sufficient to provide satisfactory results. It is preferred to use CaCO$_3$ as a filler in an amount of about 20 to 200 parts by weight per 100 parts by weight total of unsaturated polyester and unsaturated monomer. While fillers will improve hardness, reduce shrinkage and may improve elongation in some instances, care should be exercised in the use of high filler contents as this may give high viscosities and result in flow and handling difficulties.

All of the ingredients of the in-mold coating composition should be kept dry or have a minimal amount of moisture or the water content should be controlled to obtain reproducible results.

Mixing of the ingredients should be thorough. Injection or compression, transfer molding, or other molding apparatus or machines can be used for the in-mold coating. Molding apparatus and methods may be found in U.S. Pat. Nos. 4,076,780; 4,076,788; 4,081,578 and 4,082,486. Please see, also, "Proceedings of the Thirty-Second Annual Conference Reinforced Plastics/Composites Institute," SPI, Washington, February, 1977, Griffith et al, Section 2-C, pages 1–3 and "33rd Annual Technical Conference, 1978 Reinforced Plastics/Composites Institute The Society of the Plastics Industry, Inc.", SPI, Ongena, Section 14-B, pages 1–7.

The processes and products of the present invention can be used in the manufacture of automobile parts such as grille and headlamp assemblies, deck hoods, fenders, door panels and roofs as well as in the manufacture of food trays, appliance and electrical components, furniture, office machine covers, bathroom components, structural panels and so forth.

The following examples will serve to illustrate the present invention with more particularity to those skilled in the art. In the examples the parts are parts by weight unless otherwise indicated.

EXAMPLE I

Dried pellets of General Electric Company's FL-900 "Lexan," thermoplastic aromatic polycarbonate resin, were mixed with 1% by weight of Stepan Chem. Co. "Expandex" OX, believed to be 5-phenyl tetrazole, and low pressure injection molded to form 6×6×0.1 inch structural foam polycarbonate plates. After cooling the mold to about 150° F. and below, the mold was opened revealing the structural foam plates had mottled, rough and/or grainy surfaces. The cooled foam plates were removed from the mold, and their sprues were cut off. The plates were then placed in a small laboratory hydraulic press with a ½"×3 mil paper frame along the outside edge to improve the coat thickness uniformity. An external mold release agent was sprayed on the mold approximately every fifth molding; the mold release agent was Witco Chem. Corp., Organics Div., "Sunolite" 240 (a blend of petroleum waxes, typical sp. gr. (25° C.) of 0.92 and m.p. of 66°-70° C.) as a 2% dispersion in naphtha; and no release problems were encountered. About 5 grams of the in-mold coating composition were placed on the center surface of the plate; the press was closed at a pressure of 50 p.s.i.; and the in-mold coating composition was cured for from about 3 to 5 minutes at 150° F.

If there is need to further spread the coating, it was found that this can be accomplished by bringing the pressure up to a high value immediately on mold closing, holding this value for about 5 seconds to allow the coating to spread, and then dropping the pressure to 50 p.s.i. for the balance of the curing cycle.

A limited amount of coating was done immediately after injection molding the polycarbonate structural foam part. The molded foam structural part was cooled in the mold to a temperature of about 150° F. or less. Then the injection molding clamp was opened, and about 5 grams of the in-mold coating composition was placed onto the surface of the cooled part without removing it from the mold, and the clamp was reclosed for a 3 to 5 minute cycle at 50 p.s.i. and 150° F. The results obtained were identical to those obtained using the laboratory press described above.

All of the in-mold coating compositions prior to curing contained about 3% by weight of benzoyl peroxide initiator based on the total weight of the unsaturated polyester and unsaturated monomer(s) and an accelerator, dimethyl aniline. Moreover, the room temperature gel times of all of the in-mold coating compositions of the ester, monomer(s) and initiator were adjusted to a range of 3 to 8 minutes with the accelerator (about 0.15-0.25 part on 100 total parts of ester and monomer(s)). The use of benzoyl peroxide and dimethyl aniline gave fast tack free times.

All of the resulting cured in-mold coating compositions were smooth and glossy although some of the physical properties varied according to the formulation used. The polyesters and monomers employed in the in-mold compositions used as coatings on polycarbonate structural foams, and the results obtained on further tests are shown in the Tables I to III below:

TABLE I

| Run No. | Ester (1) Parts | Monomer(s) STY (2) Parts | TMPTMA (3) Parts | Adhesion | Hardness | EL% |
|---|---|---|---|---|---|---|
| 1 | 53.9 | 10 | 23.1 | Good | 2H | .55 |
| 2 | 57.4 | 15 | 24.6 | Good | 1H | .8 |
| 3 | 60.9 | 10 | 26.1 | Fair | F | 1.35 |
| 4 | 39.9 | 20 | 37.1 | Good | 2H | .63 |
| 5 | 36.4 | 15 | 45.6 | Fair-Good | 2H | 0.6 |
| 6 | 39.9 | 10 | 47.1 | Good | 1H | 0.35 |
| 7 | 57.4 | 15 | 24.6 | Good | 1H | 0.6 |
| 8 | 50.4 | 15 | 31.6 | Good | 1H | 0.9 |
| 9 | 43.4 | 15 | 36.6 | Good | 1H | 0.7 |
| 10 | 36.4 | 15 | 45.6 | Good | 1H | 0.7 |
| 11 | 49 | 30 | 21 | Good | F | 0.75 |
| 12 | 25 | 30 | 45 | Good | F | 0.4 |
| 13 | 40 | 40 | 20 | Good | F | 0.45 |
| 14 | 15 | 40 | 45 | Good | 2B | 0.35 |
| 15 | 30 | 50 | 20 | Good | 3B | .8 |
| 16 | 10 | 50 | 40 | Good | <4B | .3 |

TABLE II

| Run No. | Ester (1) Parts | STY (2) Parts | TMPTMA (3) Parts | CaCO3 Parts | Adhesion | Hardness | EL% |
|---|---|---|---|---|---|---|---|
| 17 | 53.9 | 20 | 23.1 | 40 | Good | 2H | 1.35 |
| 18 | 57.4 | 15 | 24.6 | 40 | Good | 2H | 1.5 |
| 19 | 60.9 | 10 | 26.1 | 40 | Good | F | 3.05 |
| 20 | 39.9 | 20 | 37.1 | 40 | Good | 2H | 1.0 |
| 21 | 36.4 | 15 | 45.6 | 40 | Good | 2H | 0.55 |
| 22 | 39.9 | 10 | 47.1 | 40 | Good | 1H | .55 |
| 23 | 57.4 | 15 | 24.6 | 30 | Good | 2H | 2.1 |
| 24 | 50.4 | 15 | 31.6 | 30 | Good | 2H | 2.0 |
| 25 | 43.4 | 15 | 36.6 | 30 | Good | 2H | 1.45 |
| 26 | 36.4 | 15 | 45.6 | 30 | Good | 2H | .85 |

TABLE III

| Run No. | Ester (4) Parts | MMA (5) Parts | STY (2) Parts | TMPTMA (3) Parts | Adhesion | Hardness | EL% | Comments |
|---|---|---|---|---|---|---|---|---|
| 27 | 50 | 50 | — | — | Poor | — | — | Substrate delamination |
| 28 | 80 | 20 | — | — | Good | F | — | Shrink cracks |
| 29 | 85 | — | 15 | — | Fair-Poor | 1-H | 1.05 | |
| 30 | 80 | — | 20 | — | Good | F | >1.85 | |
| 31 | 80 | — | 20 | — | Good | F | 0.5 | Jaw break |
| 32 | 75 | — | 25 | — | Good | 1-H | 2.15 | |
| 33 | 70 | — | 30 | — | Good | F | 2.15 | |
| 34 | 65 | — | 35 | — | Good | F | >2.1 | |
| 35 | 60 | — | 40 | — | Good | F | >2.35 | |

TABLE III-continued

| Run No. | Ester (4) Parts | MMA (5) Parts | STY (2) Parts | TMPTMA (3) Parts | Adhesion | Hardness | EL% | Comments |
|---|---|---|---|---|---|---|---|---|
| 36 | 50 | — | 50 | — | Good | B | 2.95 | |
| 37 | 50 | — | 50 | — | Fair-Good | 3-B | — | Substrate delam. |
| 38 | 20 | 40 | 40 | — | Poor | <4-B | — | Substrate delam. |
| 39 | 20 | 60 | 20 | — | Poor | <4-B | — | Substrate delam. |
| 40 | 20 | 20 | 60 | — | Poor | <4-B | — | Substrate delam. |
| 41 | 40 | 40 | 20 | — | Poor | <4-B | — | Substrate delam. |
| 42 | 40 | 20 | 40 | — | Poor | <4-B | — | Substrate delam. |
| 43 | 60 | 20 | 20 | — | Poor | <4-B | 3.15 | Substrate delam. |
| 44 | 20 | — | 60 | 20 | Good | B | .55 | |
| 45 | 20 | 60 | — | 20 | Good | 4-H | .55 | |
| 46 | 40 | — | 40 | 20 | Good | F | 0.6 | |
| 47 | 40 | 40 | — | 20 | Good | 2-H | 0.2 | |
| 48 | 60 | — | 20 | 20 | Good | F | >1.4 | |
| 49 | 60 | 20 | — | 20 | Good | 1-H | 0.3 | |
| 50 | 25 | 25 | 25 | 25 | Good | F | .85 | |
| 51 | 20 | 40 | — | 40 | Good | 4-H | 0.3 | |
| 52 | 20 | — | 40 | 40 | Good | F | 0.35 | |
| 53 | 40 | 20 | — | 40 | Good | 2-H | .35 | |
| 54 | 40 | — | 20 | 40 | Good | 1-H | .35 | |
| 55 | 50 | — | — | 50 | Good | 1-H | 0.4 | |
| 56 | 20 | 20 | — | 60 | Good | 4-H | — | Shrink cracks |
| 57 | 20 | — | 20 | 60 | Good | F | 0.45 | |
| 58 | 70(6) | — | 30 | — | Good | 2-H | 0.8 | |

When the in-mold coating composition consisted only of trimethylol propane trimethacrylate, coatings were obtained on the polycarbonate foam which were entirely too brittle. In-mold compositions of mixtures of styrene and high levels of trimethylolpropane trimethacrylate gave coatings on the polycarbonate foam which were too brittle and cracked badly. At higher levels of styrene with trimethylol propane trimethacrylate as an in-mold coating composition, the resulting coatings on the polycarbonate foam were cheesy with gross delamination at the coating-substrate interface. Mixtures of only methyl methacrylate and trimethylol propane trimethacrylate on polymerization gave coatings on the polycarbonate foam which exhibited high shrinkage and low elongations. Styrene and methylmethacrylate were not tried alone as coatings since they tend to attack the substrate and homopolymerized poorly under the above conditions. Also, the polyester was not tried by itself since it does not satisfactorily homopolymerize under the above conditions.

EXAMPLE II

The method of this example was the same as that of Example I, above, except that the structural foam substrate was a thermoplastic acrylonitrile-butadiene-styrene terpolymer resin (The Dow Chemical Company ABS resin AH-41103) blown with "Expandex" OX.

The polyester was polyester (1), benzoyl peroxide was used as an initiator with dimethylaniline as the accelerator or promoter in the amounts shown in Example I. The amounts of polyester and monomer(s) used for the in-mold coating composition as well as the results obtained are shown in Table IV, below:

TABLE IV

| Run No. | Ester (1) Parts | STY (2) Parts | TMPTMA (3) Parts | Adhesion |
|---|---|---|---|---|
| 59 | 87 | 10 | — | Good |
| 60 | 57 | 10 | 30 | Good |
| 61 | 82 | 15 | — | Variable |
| 62 | 52 | 15 | 30 | Good |
| 63 | 77 | 20 | — | Good |
| 64 | 57 | 20 | 30 | Good |
| 65 | 82 | 15 | — | Good |
| 66 | 72 | 15 | 10 | Good |
| 67 | 52 | 15 | 30 | Good |
| 68 | 70 | 30 | — | None |
| 69 | 21.4 | 40 | 38 | Tacky |
| 70 | 14.3 | 50 | 35.7 | None |

(1) Polypropylene phthalate fumarate polyester having a molecular weight of about 2000. Prepared according to the teachings of U.S. Pat. No. 3,538,043 by reacting propylene oxide with maleic anhydride and phthalic anhydride initiated by fumaric acid using a double metal cyanide catalyst and isomerized with piperidine. Sufficient propylene oxide was used to give essentially OH termination; mole ratio of maleic anhydride to phthalic anhydride was 2:1.
(2) Styrene.
(3) Trimethylol propane trimethacrylate, "Chemlink" 3080, may contain some residual OH groups. Hughson Chems.
(4) Bisphenol A-fumarate polyester. "Atlac" 382 E. I.C.I. United States, Inc.
(5) Methylmethacrylate.
(6) Polyester used was Dow Chemical Co. 7608.05 which is based on Bisphenol A.

Adhesion—A sharp scapel was used to pick the coating off of the substrate. Any interfacial peeling was considered a failure.

Hardness—ASTM pencil hardness test D3363-74 was used. The classification is as follows:
7B (softest) through B, HB, F and 1H through 7H (hardest). The reported values are those for indentation. "Scratch" value would be up to two pencil values higher.

EL%—Percent elongation. Coated substrates were cut into 6"×½" tensile specimens and pulled in an Instron machine. Reported elongations are extensometer values at the point of coating failure. In a few cases where the substrate failed first, elongations were reported as "greater than," e.g., ">" (substrate elongations to failure were usually 2–3%, thus the coating had a greater elongation). Accordingly, the elongations reported here have relative significance but may not represent true elongation values of the in-mold coating composition itself.

We claim:

1. The method which comprises in-mold coating a molded structural foam part of a thermoplastic resin selected from the group consisting of an aromatic polycarbonate resin and an ABS polymer resin with a thermosetting in-mold coating composition and heating said composition at a temperature not in excess of about 200° F. for from about 1 to 10 minutes at a pressure of from about 25 to 50 p.s.i. to cure the same to form an adherent, hard and glossy coating, said in-mold coating composition comprising (a) an ethylenically unsaturated polyester having an average molecular weight of from about 1,000 to 4,500 and
   (b) at least one ethylenically unsaturated monomer having from one to four polymerizable unsaturated carbon-to-carbon double bonds, said monomer being present in an amount sufficient to copolymerize with and crosslink said unsaturated polyester to form a hard, adherent, glossy and thermoset coating, in admixture with
   (c) an organic free radical peroxide initiator in an amount of from about 1.5 to 6% by weight based on the weight of the unsaturated polyester and the unsaturated monomer and
   (d) an accelerator for said peroxide initiator in an amount not in excess of about 1.0% by weight based on the weight of the unsaturated polyester and the unsaturated monomer.

2. The method according to claim 1 wherein said curing time is from about 1 to 3 minutes and said polyester is a substantially fumarate polyester.

3. The method according to claim 1 wherein the ratio of said unsaturated ester to said unsaturated monomer(s) is from about 20:80 to 80:20 parts by weight and said polyester is a fumarate polyester.

4. The method according to claim 3 where said curing time is from about 3 to 5 minutes, said ester is a polypropylene phthalate fumarate polyester, said monomer is a mixture of styrene and trimethylol propane trimethacrylate, said initiator is benzoyl peroxide and said accelerator is dimethyl aniline.

5. The method according to claim 4 in which said in-mold coating composition additionally contains $CaCO_3$ in an amount of from about 20 to 200 parts by weight per 100 parts by weight total of said polyester and said monomer.

6. The product produced by the method of claim 1.
7. The product produced by the method of claim 2.
8. The product produced by the method of claim 3.
9. The product produced by the method of claim 4.
10. The product produced by the method of claim 5.

* * * * *